Oct. 25, 1927. 1,646,654
E. L. McMURTREY
SHANK AND EDGE TRIMMER
Filed May 21, 1926 2 Sheets-Sheet 1
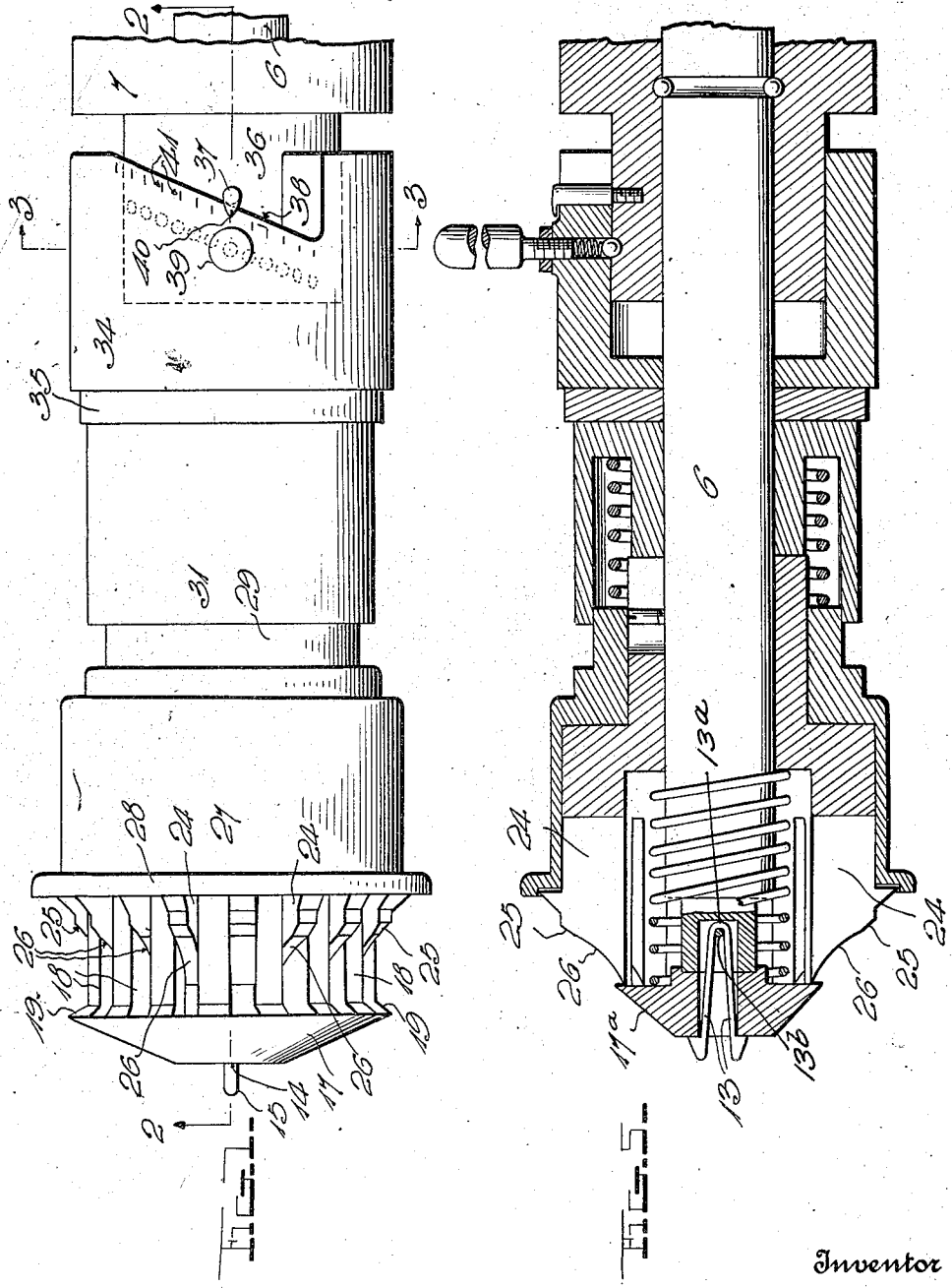
Witnesses
H. Woodard
Inventor
E. L. McMurtrey
By H. B. Willson &co
Attorneys

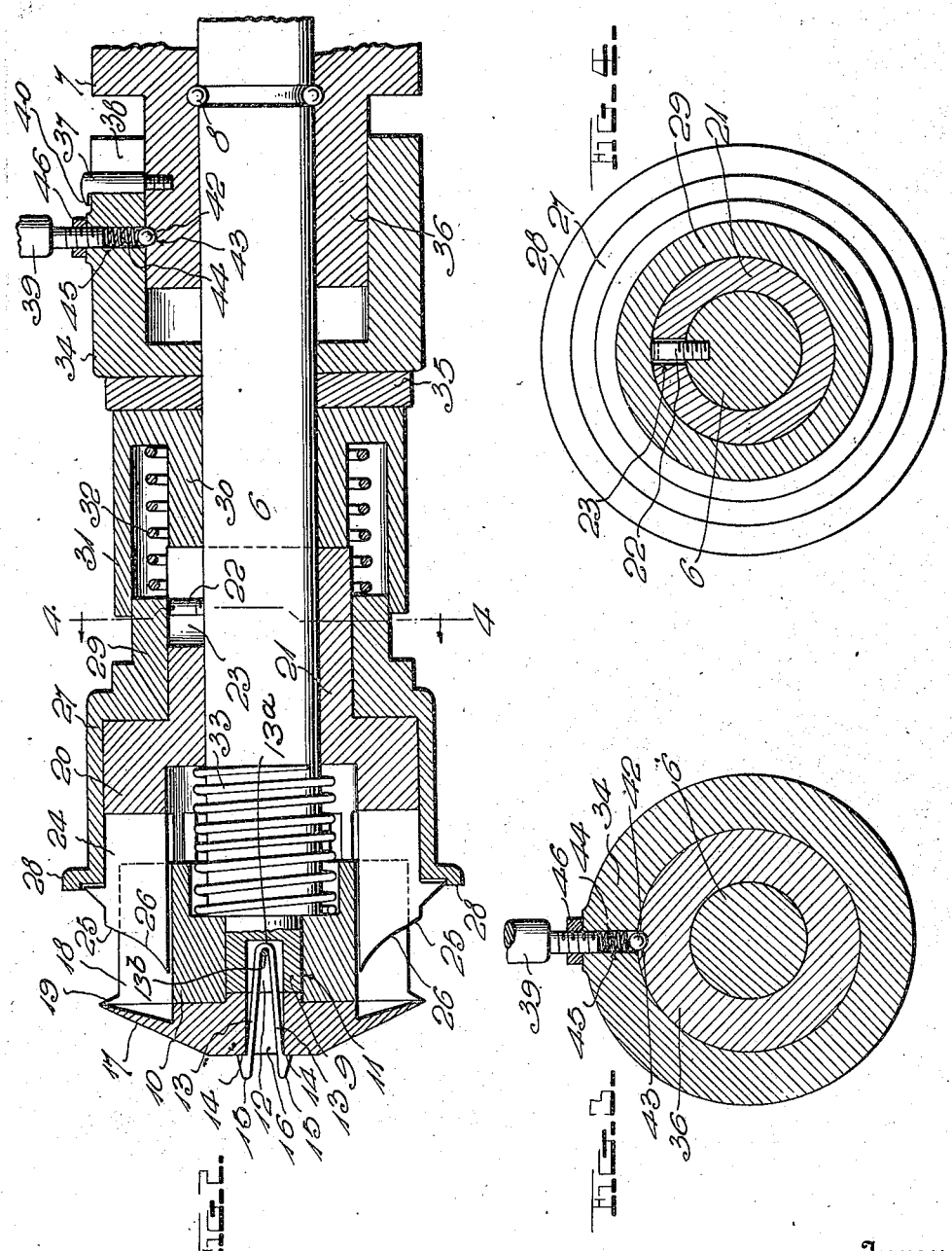

Patented Oct. 25, 1927.

1,646,654

UNITED STATES PATENT OFFICE.

ELISHA L. McMURTREY, OF RISON, ARKANSAS.

SHANK AND EDGE TRIMMER.

Application filed May 21, 1926. Serial No. 110,729.

The invention relates to improvements in rotary means for trimming the edges of shoe soles and shanks, and one object of the invention is to provide a novel construction and arrangement of parts whereby sole edges of different thicknesses may be trimmed upon a single adjustable cutting means, without the necessity of inter-changing cutters as is now ordinary necessary.

A further object is to provide a sole edge trimmer of the type set forth which is readily convertible for use as a shank trimmer.

A further aim is to provide a shank trimming cutter having a portion which is co-operable with an edge trimming cutter, and when so co-operating serves to slightly bevel the sole edge.

A still further aim is to make unique provision whereby one cutter may be quickly and easily removed and another guard quickly applied in place of the removed cutter and its co-acting guard, the construction being such that it is unnecessary to waste time by the removal of a screw when making these changes.

With the foregoing and minor objects in view, the invention resides in the novel subject matter hereinafter described and claimed, the description being supplemented by the accompanying drawings.

Figure 1 is a side elevation of the invention, showing the two cutters in co-operative relation for trimming and beveling the edge of a sole.

Figure 2 is a longitudinal sectional view on the plane of line 2—2 of Fig. 1.

Figures 3 and 4 are transverse sections on lines 3—3 and 4—4 of Figs. 1 and 2 respectively.

Figure 5 is a longitudinal sectional view similar to Fig. 2, but illustrating the device converted for use as a shank trimmer.

Until further stated, attention will first be directed only to Figs. 1 to 4. Then, later the converted device disclosed in Fig. 5 will be described.

The numeral 6 designates a shaft which may be driven and rotatably supported in any desired manner, and 7 may be considered as a portion of a stand or frame for supporting said shaft, ball bearings 8 being preferably utilized to insure easy rotation.

The shaft 6 preferably formed with a reduced outer end 9 and an edge-trimming cutter 10 is formed with an axial bore 11 which receives said reduced shaft end. This shaft end is formed with a socket 12 open only at one end of the shaft, in which a pair of spring arms 13 are received, the inner ends of said arms being integrally connected by a bight portion 13$^a$. A pin 13$^b$ spans the socket 12 and is received in this bight portion to hold the arms in place. These arms 13 are formed with shoulders 14 facing the closed end of the socket 12, and with bevels 15 which diverge inwardly to said shoulders 14.

The arms 13 are receivable in an axial opening 16 in a guard disk 17 for the circumferentially spaced cutting teeth 18 of the cutter 10, and under their own resiliency said arms are held in the position shown in Fig. 2, for the purpose of securing the guard disk 17 in place. By engaging the outer ends of the arms however, and moving them inwardly to the desired extent, the disk 17 will be freed so that it and the cutter 10 may readily be removed. The peripheral edge of the disk 17 is preferably even with the projecting portions 19 of the teeth 18, which portions serve to form a bevel on a sole whose edge is trimmed by the cutter 10.

A second cutter 20, of annular form, is provided with a hub 21 which is slidable upon the shaft 6, in inwardly spaced relation with the cutter 10, said hub having a driving connection with the shaft 6, which connection is preferably formed by a stud 22 and receiving slot 23. Cutter 20 is provided with a plurality of teeth 24 which project toward the guard disk 17 and are slidably received between the teeth 18, said teeth 24 having portions 25 co-operable with the tooth portions 19 and the edges of the teeth 18 in properly trimming and beveling the edge of a shoe sole. By means yet to be described, the cutter 20 may be adjusted toward or from the guard disk 17, so that the effective edge-trimming portion of the co-acting cutters 10—20 may be varied according to the thickness of the sole.

The outer ends of the teeth 24 are suitably shaped as at 26, to form shank trimmers. These shank-trimming portions however are normally disposed between the teeth of the cutter 10 and when this cutter is applied to the device in the manner so far described, the portions 26 are inwardly spaced from the peripheries of the teeth 18 and do not function. The manner in which they are brought into play, will be hereinafter described.

A sleeve-like guard 27 slidably surrounds the cutter 20 and has a portion 28 which guards the adjacent portions of its cutting teeth so as to prevent injury to the operator. This guard 27 is provided with a hub 29 which is slidable upon the hub 21. A thrust collar 30 slidably surrounds the shaft 6 and abuts the inner end of the hub 21, said collar 30 being formed with a surrounding sleeve 31 which slidably surrounds the hub 29 of the guard 27. A coiled, compression spring 32 surrounds the hub 30 and the adjacent portion of the hub 21 and bears against the hub 29 of the guard 27 so as to always force the latter outwardly to its maximum, operative position. Provision is made for moving the thrust collar 30 toward the guard disk 17 for the purpose of projecting the cutter 20 to any desired extent, but such movement will not affect the compression or action of the spring 32, as said thrust collar forces directly against the hub 21 of said cutter 20, so as to impart direct movement to the cutter, instead of relying upon the spring to impart such movement.

Another coiled, compression spring 33, surrounds the shaft 6 and is interposed between the two cutters 10 and 20, which are preferably recessed to receive it, said spring 33 serving to hold the cutter 10 forwardly against the guard disk 17. This spring also functions to return the cutter 20 in a direction away from the guard disk 17, when such return movement is permitted.

A thrust member 34 is provided for the thrust collar 30—31, and a wear-resisting washer 35 is preferably interposed between these parts. In the construction shown, the member 34 is of cup-like form and surrounds a cylindrical extension 36 on the bearing or the like 7. This extension is provided with a radial abutment 37 and the member 34 is provided with a cam 38 which engages said abutment. Thus, when member 34 is rotated by means of a suitable handle 39, movement of the member 34 longitudinally of the shaft 6 will be effected, and by such movement, it will be seen that the cutter 20 will be either moved toward or from the guard disk 17, as occasion may demand. The abutment 37 preferably carries a pointer 40 cooperable with appropriate indicating means 41 on the member 34, so as to permit quick and accurate setting of the cutting means for trimming any thickness of sole.

To hold the member 34 in adjusted position, a ball 42 engageable in sockets 43, is employed. This ball and a projecting spring 44 for the same, are disposed in a radial opening 45 formed in the member 34, and to retain the spring under compression, the handle 39 may well have a reduced inner end threaded into said opening, a lock-nut 46 being employed to secure the handle against accidental turning. By loosening this lock-nut and threading the handle further into the opening, the strength of the spring 44 may be increased from time to time, as occasion may require.

Figure 5 discloses the mechanism above described, converted for use as a shank trimmer. In this view, the edge trimming cutter 10 and the guard disk 17 have been entirely removed, and substituted for these parts, is a smaller guard disk 17$^a$ which is held in place by the spring arms 13. When the device is converted in this manner, it is readily usable for shank trimming, and the shank-trimming portions 26 of the teeth 24 are exposed for use.

It will be seen from the foregoing that while the invention is rather simple and inexpensive, it will be highly desirable, may be quickly and easily adjusted for trimming soles of any desired thicknesses, and may also be readily converted for use as a shank trimmer instead of a sole edge trimmer.

On account of the excellent results flowing from the details shown, they are preferably followed. However, within the scope of the invention as claimed, variations may be made.

I claim :—

1. A convertible sole edge trimmer and shank trimmer, comprising a rotatable shaft, a guard disk carried detachably by one end of said shaft and projecting laterally therefrom, a sole edge cutter of annular form surrounding said shaft at the inner side of said guard disk, said cutter having cutting teeth spaced apart around its periphery, an edge-beveling cutter of annular form slidably surrounding and having a driving connection with the shaft, said edge-beveling cutter having teeth which are slidably received between the teeth of said sole edge cutter, said teeth of the edge-beveling cutter having shank trimming portions normally spaced radially inward from the peripheries of the teeth of said sole edge cutter, and exposed for use upon removal of said sole edge cutter and said guard disk and substitution of a smaller guard disk for the removed disk, and means for effecting movement of the edge beveling cutter toward or from the guard disk.

2. A sole edge trimmer comprising a rotatable shaft, a guard disk carried detachably by one end of said shaft and projecting laterally therefrom, a sole-edge cutter of annular form surrounding said shaft and contacting with the inner side of said guard disk, said cutter having cutting teeth spaced apart around its periphery, an edge-beveling cutter of annular form having a hub slidably surrounding the shaft in inwardly spaced relation with said edge-trimming cutter, a driving connection between said hub and shaft, said edge-beveling cutter having teeth which are slidably received between the teeth of said edge-triming cutter, a spring surrounding the shaft between the two cutters and holding said edge-trimming cutter against said guard disk, a guard sleeve surrounding said edge-beveling cutter, a thrust collar slidable upon the shaft and engaging the inner end of said edge-beveling cutter, means for forcing said collar toward said guard disk, and a spring between portions of said collar and said guard sleeve for urging the latter toward said guard disk, said sleeve and said edge-beveling cutter having co-acting portions to limit the movement of the sleeve under the action of the second named spring.

3. In a convertible sole edge trimmer and shank trimmer, a rotary shaft, an edge trimming cutter detachably mounted thereon and having teeth spaced apart around its circumference, and an edge-beveling cutter slidably surrounding the shaft and having edge-beveling teeth on one end which are slidably received between the first named teeth, the outer ends of said edge-beveling teeth being shaped to form shank trimmers which are normally spaced radially inward from the peripheries of said first named teeth, whereby upon removal of said edge trimming cutter, said shank trimming teeth will be exposed for use.

4. In a convertible sole edge trimmer and shank trimmer, and edge-trimming cutter having teeth spaced apart around its circumference, an edge-beveling cutter having edge-beveling teeth on one end removably received between the first named teeth, the outer ends of said edge-beveling teeth being shaped to form shank trimmers which are normally spaced radially inward from the peripheries of said first named teeth, and means detachably holding said edge-trimming cutter in concentric assembled relation with said edge-beveling cutter, whereby upon removal of said edge-trimming cutter, said shank trimming teeth will be exposed for use.

In testimony whereof I have hereunto affixed my signature.

ELISHA L. McMURTREY.